(12) United States Patent
Morris et al.

(10) Patent No.: US 10,311,028 B2
(45) Date of Patent: Jun. 4, 2019

(54) METHOD AND APPARATUS FOR REPLICATION SIZE ESTIMATION AND PROGRESS MONITORING

(71) Applicant: Oracle International Corporation, Redwood City, CA (US)

(72) Inventors: Richard J. Morris, Newton, MA (US); Waikwan Hui, Fremont, CA (US); Mark Maybee, Boulder, CO (US)

(73) Assignee: Oracle International Corporation, Redwood Shores, CA (US)

(*) Notice: Subject to any disclaimer, the term of this patent is extended or adjusted under 35 U.S.C. 154(b) by 681 days.

(21) Appl. No.: 13/896,033

(22) Filed: May 16, 2013

(65) Prior Publication Data

US 2014/0344222 A1 Nov. 20, 2014

(51) Int. Cl.
*G06F 16/182* (2019.01)

(52) U.S. Cl.
CPC .................. *G06F 16/1844* (2019.01)

(58) Field of Classification Search
USPC ........................................................ 707/634
See application file for complete search history.

(56) References Cited

U.S. PATENT DOCUMENTS

| 8,332,354 | B1 | 12/2012 | Chatterjee et al. |
| 8,819,362 | B1 | 8/2014 | Duprey et al. |
| 8,892,833 | B2 | 11/2014 | Smith et al. |
| 9,021,046 | B2* | 4/2015 | Mayo .................... G06F 9/5077 709/213 |
| 9,087,008 | B1 | 7/2015 | Natanzon |
| 9,430,542 | B2 | 8/2016 | Akirav et al. |
| 2004/0267836 | A1* | 12/2004 | Armangau .......... G06F 11/1435 |
| 2005/0114401 | A1* | 5/2005 | Conkel ............... G06F 11/0709 |
| 2009/0070390 | A1* | 3/2009 | Okada ................. G06F 11/1469 |
| 2011/0191295 | A1* | 8/2011 | Ozdemir ................ G06F 17/30 707/639 |

* cited by examiner

*Primary Examiner* — Muluemebet Gurmu
(74) *Attorney, Agent, or Firm* — Kilpatrick Townsend & Stockton LLP (57) ABSTRACT

Implementations of the present disclosure involve a system and/or method for replication size estimation and progress monitoring for a file system residing on a computing system. The replication progress monitoring system obtains a first snapshot of a file system for a first point in time and a second snapshot of the file system for a second point in time. The system may then calculate the difference between the first snapshot size from the second snapshot size and add to the difference the size a released data size. The released data size includes the size of any blocks of data included in the first snapshot and released before the second snapshot was taken. The replication transfer size may then be estimated by adding the snapshot size difference with the released size estimate.

17 Claims, 9 Drawing Sheets

METHOD AND APPARATUS FOR REPLICATION SIZE ESTIMATION AND PROGRESS MONITORING

FIELD OF THE DISCLOSURE

Aspects of the present disclosure relate to file systems. More particularly, aspects of the present disclosure involve an apparatus and method for estimating the size of datasets used for replication and monitoring replication progress.

BACKGROUND

As the number of computing devices increase across society, electronic data management has become increasingly challenging. Modern devices create and use ever increasing amounts of electronic data ranging from digital photos and videos, to large data sets related to any number of topics including energy exploration, human resources, seismic activity, and gene research. This explosion in digital data has naturally led to ever increasingly large amounts of data that must be stored. Correspondingly, the data storage field is under constant pressure to increase size, performance, accessibility, reliability, security, and efficiency of data storage systems.

In order to meet these demands for data storage, various storage systems have been developed. Large scale storage systems often include storage appliances that include arrays of spinning hard drives, magnetic tape drives, and/or solid state drives. Multiple storage appliances may be networked together to form a cluster. A cluster of storage appliances provides for added capacity as well as added redundancy, as compared to a single appliance. Storage appliances in a cluster may be configured to synchronize data between the clustered appliances to increase both access speeds and availability.

Figure 1:
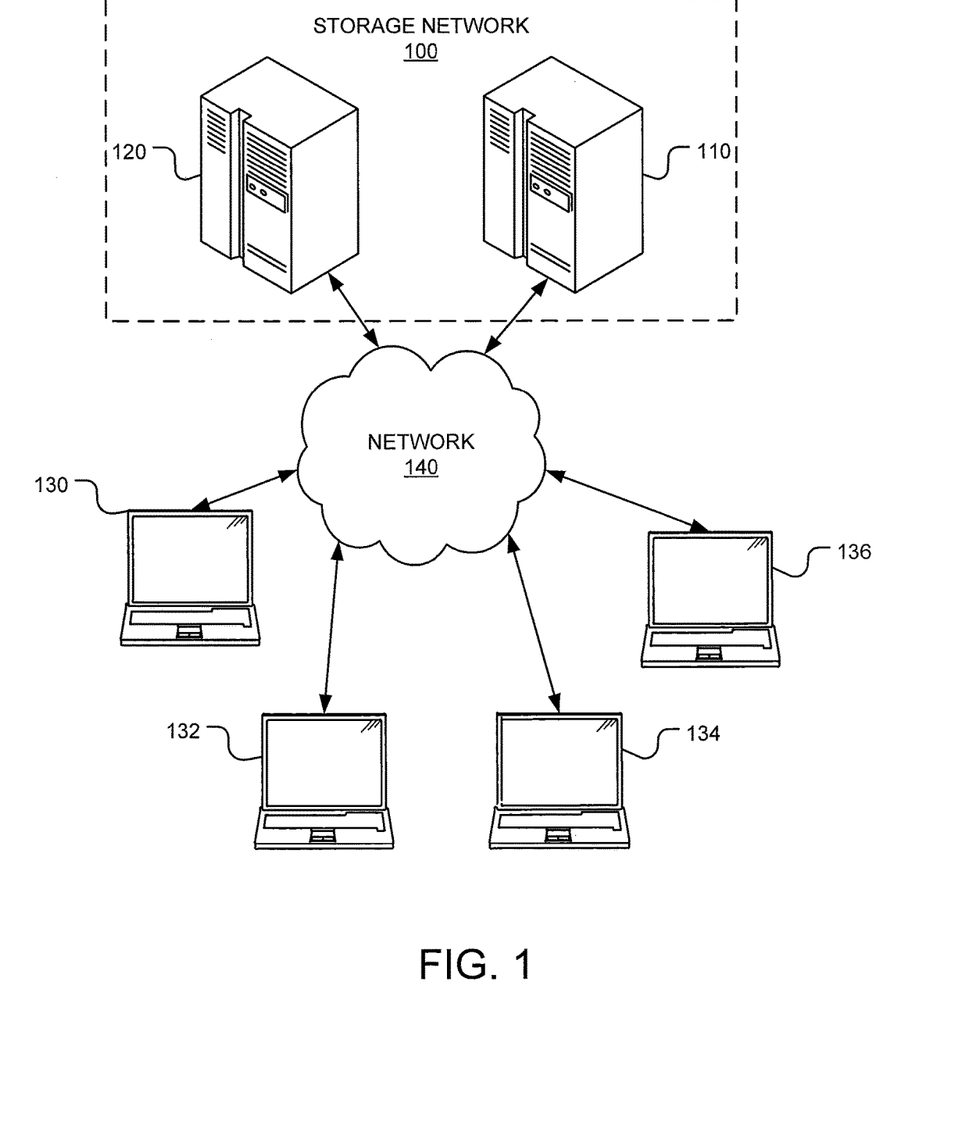
FIG. 1 is a block diagram illustrating an example of a file system environment.

Referring to FIG. 1, an example storage network 100 is depicted. This example storage network includes one or more of Oracle's ZFS storage appliances 110, 120 each including one or more disk drives. As mentioned, the storage appliances may be clustered; therefore, a second storage appliance 120 may be configured to sync with a first storage appliance 110. The storage network 100 is accessible by clients 130, 132, 134, 136 using a network 140. Generally speaking, the storage appliance 110, 120 manages the storage of data on spinning disk or solid state hard drives. The depicted networks may be local in nature or geographically dispersed such as with large private enterprise networks or the Internet.

Although discussed in the context of ZFS appliances, the storage appliances 110, 120 may include any conventional storage appliance. ZFS is a combined file system and volume manager designed by Sun Microsystems® in 2005 that allows for data integrity verification and repair, high storage capacities, along with numerous other features. ZFS based systems utilize storage pools (often referred to, as zpools) constructed of virtual devices (often referred to as vdevs) constructed of block devices. A block device is any device that moves data in the form of blocks including hard disk drives and flash drives. A ZFS volume is a dataset that represents a single block device. A virtual device (vdev) may span a number of block devices/volumes and a zpool may include one or more vdevs.

One feature of computing systems running ZFS, as well as other file systems, is the ability to perform replication. Replication allows for a first system to create a replica of itself or a portion of itself on another system by utilizing snapshots. One advantage of replication is that it allows for the second system to be regularly synchronized to the first system. For example, the systems may be configured to perform replication at certain times thereby keeping the systems relatively synchronized. This is accomplished by taking snapshots of the various file systems, volumes, or datasets on the first network storage appliance that a user wishes to replicate and then transferring the snapshots and any associated data to the second network storage appliance. Although the process of creating a snapshot on the first network storage appliance is very quick, the replication process may take a significant amount of time, sometimes taking many hours to complete, depending on the size of the data to be replicated.

Currently systems suffer from not being able to accurately monitor the progress of replication, or determining that the replication has encountered a problem causing the replication to hang or fail entirely. Because of this, an administrator may suspect a problem had occurred and needlessly restart the replication causing replications to take even longer than required and causing user dissatisfaction among other problems.

It is with these and other issues in mind that various aspects of the present disclosure were developed.

SUMMARY

Implementations of the present disclosure involve a system and/or method for replication progress monitoring in file systems. More specifically, the system and method allow for the estimation of the size of a data transfer that will take place due to the replication, and using the estimated transfer size and transfer statistics, estimates the progress of the replication as time elapses.

DETAILED DESCRIPTION

Implementations of the present disclosure involve a system and/or method for monitoring replication progress. In particular, the present disclosure provides for a system and method for estimating the progress of replication between a first network storage appliance and a second network storage appliance (or multiple appliances) or a single network storage appliance performing a replication to itself. The replication monitoring system allows for an estimation of the amount of data that will be transferred from the first network storage appliance and the second network storage appliance and provide an estimated progress, estimated time of completion, and data transfer rate as time elapses.

The estimation of the amount of data that will be transferred during the replication may be quickly and efficiently calculated by adding a snapshot size difference to the size of the current dead list. This may be done by comparing the size of a current snapshot being replicated and the size of a corresponding past snapshot that was replicated immediately prior to the current replication. The dead list, as further explained below, includes a listing of any blocks that were included in the past snapshot, but were released before the current snapshot. The sizes of the snapshots are generally known by the operating system and file system, while the dead list size may be quickly calculated. Thus, the estimation of the transfer size may involve obtaining each of the sizes from the operating system or file system and performing subtraction and addition. Once the transfer size has been estimated, the progress may be estimated by monitoring the total bytes transferred, transfer speed, and elapsed time.

Figure 2:
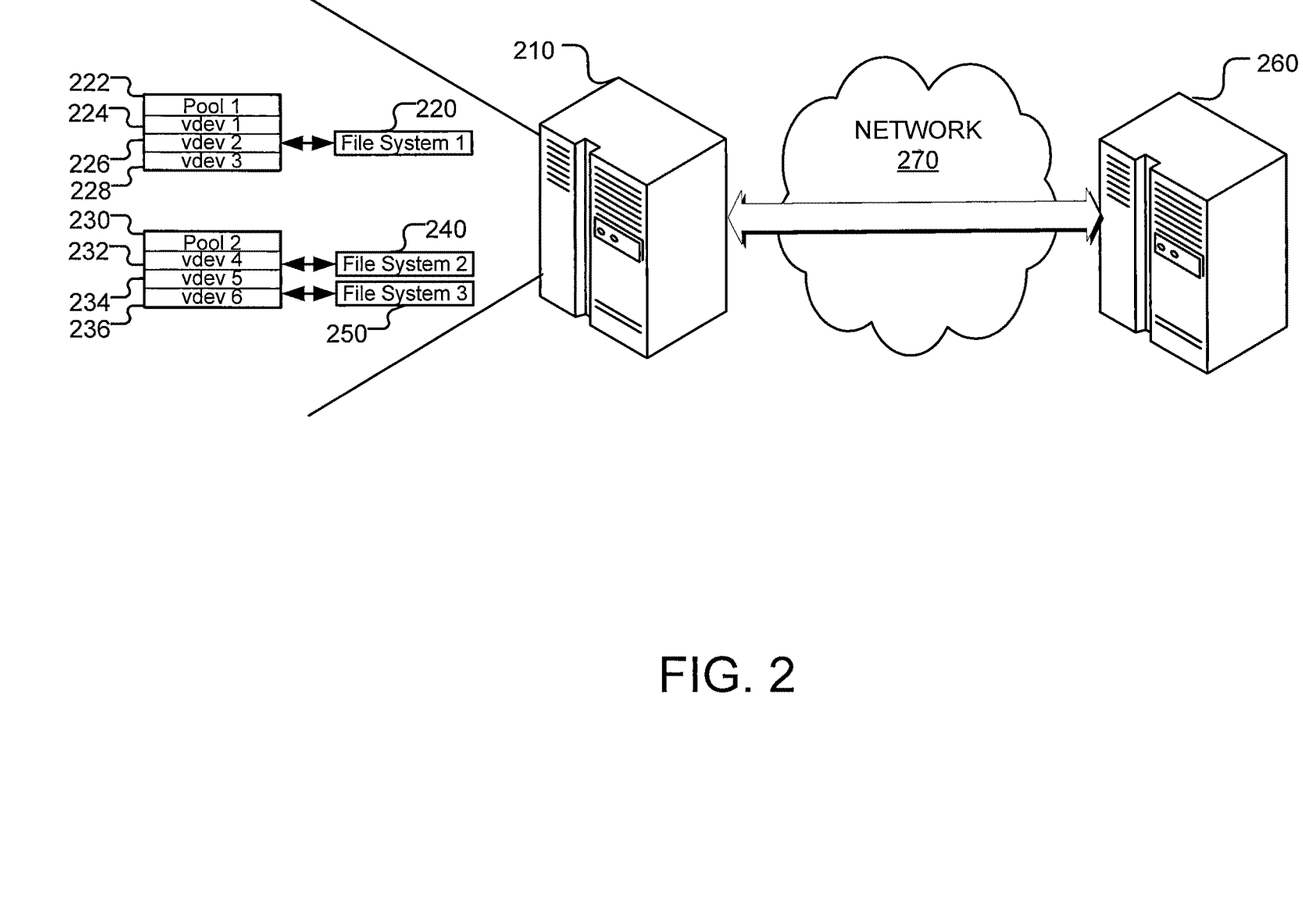
FIG. 2 is a block diagram illustrating a first system and a second system configured for replication.

Referring to FIG. 2, a first network storage appliance 210 and a second network storage appliance 260 that are in communication using a network 270 or other form of communication, are depicted. Each network storage appliance manages files and volumes and allows access to the files and volumes the files through a file system, such as ZFS. In this example, the first network storage appliance 210 is operating using multiple file systems 220, 240, 250 spread across two pools 222, 230 that each include three virtual devices (vdevs) 224, 226, 228, 232, 234, 236. The first file system 220 is configured on the first pool 222 and the second and third file systems 240, 250 are configured on the second pool 230. It should be understood that in various other examples, the first network storage appliance 210 and the second network storage appliance 260 may be configured with any number of file systems, pools, volumes, and virtual devices. The second network storage appliance 260 also includes one or more pools, each with one or more vdevs, and may also include one or more file systems. In this example, the first and second network storage appliances 210, 260 may be configured to host one or more of the same file systems 220, 240, 250.

The replication from the first network storage appliance 210 to the second network storage appliance 260 may involve snapshots. One feature of network storage appliances 210, 260, is the ability to save an image of the network storage appliance 210, 260 and use that image to recreate the state of the network storage appliance 110, 120 at a later time. This image is referred to as a "snapshot." Snapshots are, more specifically, read-only copies of a file system or volume on a network storage appliance or other storage device that includes information required to reproduce the file system or volume at the time of the snapshot. Put another way, a snapshot is a copy of a specified dataset that also includes any hierarchical information necessary to reproduce the dataset in content and structure. Snapshots can be created quickly, and they initially consume little disk space. However, as data within the active dataset changes, the snapshot consumes additional disk space by continuing to reference the old data, thus preventing the disk space from being freed.

More specifically, the first network storage appliance 210 may be configured to regularly take snapshots of one or more file systems 220, 240, 250, volumes, or other datasets. To perform replication, one or more snapshots may be sent from the first network storage appliance 210 to the second network storage appliance 260. In the context of ZFS, the data transfer may be accomplished using a ZFS send command and a ZFS receive command. The ZFS send command may include a list of one or more snapshots being sent as well as the destination location and any connection information required for sending the snapshots. The ZFS send operation may then appropriately package each data block being sent and transfers the data blocks in accordance with the sending standard being used. For example, the first network storage appliance 210 may connect to the second network storage appliance 260 using a Transmission Control Protocol/Internet Protocol (TCP/IP) connection, and therefore the snapshot(s) being sent may have appropriate header information added to each data block sent to the second network storage appliance. When performing a replication to a second network storage appliance, a command to receive the snapshot(s) is issued on the second network storage appliance contemporaneously with the entering of the send command.

In another example, the first network storage appliance 210 may be performing replication to another portion of the first network storage appliance. In this example, the first network storage appliance 210 may replicate the file system 220 onto a different storage pool 230. Thus, the send operation in this case does not involve using a TCP/IP connection and simply involves file transfer protocols within a single system.

Figure 3:
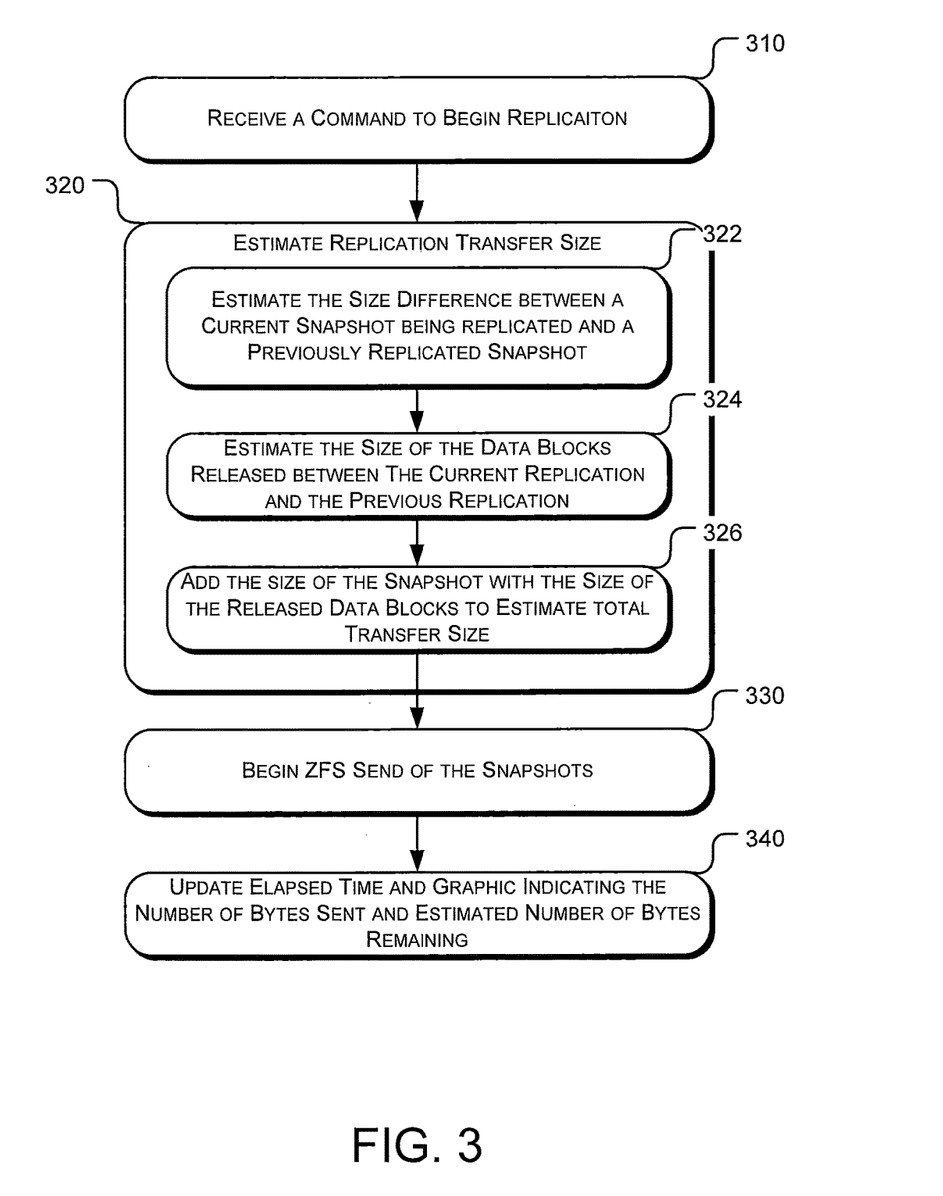
FIG. 3 is a flow diagram illustrating an example method of replication progress monitoring in accordance with this disclosure.

Referring now to FIG. 3, an example flow diagram of replication monitoring process is depicted. In this example, the replication process may be started by a user or an automated process, and may involve the execution of one or more replication related commands on a first network storage appliance (operation 310). The replication may be directed at performing replication between a first network storage appliance and a second network storage appliance. Although the examples below are discussed in relation to a replication between two discrete network storage appliances, it should be understood that replication may involve replicating one or more file systems from one part of a network storage appliance to a second part of the same network storage appliance and that the process described involves the execution of commands and monitoring of a single network storage appliance. The one or more replication related commands may, for example, include commands to take one or more snapshots of one or more file systems targeted for replication as well as executing a ZFS send command on the first network storage appliance and a ZFS receive command on a second network storage appliance. Before the send/receive commands have been executed, the replication process monitoring system may be initiated.

In the specific method discussed hereafter, replication progress monitoring system performs three primary functions including estimating the size of the transfer that will be made for the replication (operation 320), monitoring the replication process, and providing the user with a replication progress estimation (operation 340). Once the size of the transfer is estimated, the first network storage appliance may begin sending blocks of data to the second network storage appliance (operation 330). Once data has begun to be transferred, the replication progress monitoring system may monitor and display any data related to the replication including the elapsed time of the replication, the total estimated transfer size, and the amount of data transferred as time elapses (operation 340).

Estimating the size of the data transfer that will be performed for the replication (operation 320) takes place before any data is sent from the first network storage appliance to the second network storage appliance. The estimation of the transfer size includes estimating the amount of data that will be transferred that is related to snapshot(s) being replicated (operation 322), estimating the size of the data being transferred related to data blocks that have been released for to the operating system for overwriting since a previous replication (operation 324), and adding the size estimates (operation 326). Each of these operations are now discussed in more detail.

In various embodiments, the estimation of the overall replication transfer size begins with estimating the size of a transfer related to a snapshot being replicated by comparing the size of the snapshot(s) being replicated to the corresponding previously transferred snapshot(s). The blocks that are included in a snapshot are analyzed to determine the size of the snapshot. So, for example if a first snapshot has two blocks with a size of 1 kB and 10 kB, then the total snapshot size would be 11 kB. The aggregate size of the blocks for each snapshot included in the replication may then be compared to the size of the corresponding snapshots sent during the last replication and the difference in size for each snapshot may be totaled. The total difference in size is then used as the estimated transfer size for the snapshots (operation 322). Thus, if a second snapshot has a size of 20 kB, the estimated transfer size would be the difference in size between the first and second snapshots, in this case 9 kB. In addition to using the difference in snapshot size to estimate the total transfer size, the replication will also include transferring data related to deleted data, which in turn needs to be added to the total transfer size.

In addition to determining the snapshot size difference, the replication transfer also includes data sent that is related to data blocks that were in the previously sent snapshot(s), but have subsequently been deleted (operation 324). When a file has been deleted, the data blocks storing the information in that file are "released" so that they are no longer referenced in the file system and the locations of the released data blocks may be written over with new data. The total size of the data blocks that have been released may be determined by analyzing a "dead list" corresponding to each snapshot. A dead list includes a list of data blocks that were in the previous snapshot and have since been released before the corresponding snapshot was taken. For example, if a block was created, often referred to as being "born," before the previous snapshot and is deleted, often referred to as having "died," after the previous snapshot, but before the current snapshot, then in addition to the block being released, the block is added to the dead list associated with the current snapshot. Continuing the example from above, the second snapshot may include a dead list that references a 10 kB block from the first snapshot that was deleted before the second snapshot was taken. Thus, the size estimate of the released blocks is 10 kB.

The replication transfer size may then be estimated by adding the snapshot size difference to the dead list size (operation 326). Thus, in the example above the estimated replication transfer size is 19 kB since the snapshot size difference was 9 kB and the dead list size was 10 kB.

Referring now to FIGS. 4A-D, a simplified ZFS file system 400 and the changes that occur to it over the course of three days, or otherwise at four points in time are illustrated to provide an example file system for replication progress monitoring. In this example, the file system 400 has a tree-like structure starting with a root node 402-408 and spanning to leaf nodes 420-430 containing blocks of data. When a user attempts to access data, the operating system, in this case ZFS, is tasked with navigating the tree to access the requested data. For example, with reference to FIG. 4A, a request for data block 1 (420) may be received. In order to retrieve data block 1 (420) the network storage appliance starts at root block 1 (402) and traverses to the appropriate intermediary node 410, and then to the requested data block 1 (420). It should be understood that a file system may include a large number of blocks (ZFS currently has a theoretical maximum number of files of $2^{48}$, each of which may have a size up to $2^{64}$ bytes, and a *variable* block size of up to 1 MB). In addition to the blocks storing file data, each file system also includes one or more layers of intermediary blocks used to navigate from the root to each leaf. The represented file system 400 is only provided as a simplified example for illustrative purposes. Each type of block may be of a different size. For example, a "root block" may consume one kilobyte of space on a network storage appliance, while an "intermediary block" may also consume one kilobyte of space but each "data block" may consume one megabyte of space. Each intermediary block may include pointers to one or more data blocks, and each intermediate block also includes information allowing the intermediary block to function as a node for navigating the file system to access data blocks.

Figure 4A:
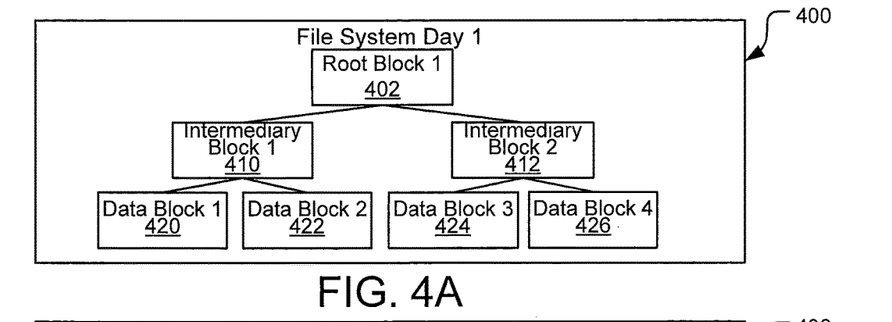
FIGS. 4A-D are block diagrams illustrating an example file system structure and changes to the structure at four distinct points in time (e.g. three days).
Figure 5A:
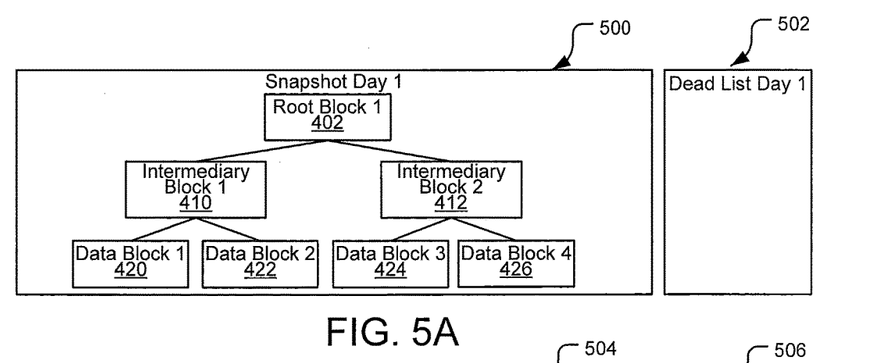
FIGS. 5A-C are block diagrams of snapshots and dead lists at three distinct points in time, which correspond to the example file system changes of FIGS. 4A-D.

Referring now specifically to FIGS. 4A and 5A, a snapshot 500 of the file system 400, and a dead list 502 are depicted. In the figures, a node represented by a heavy lined box, such as root block 2 (404), indicates a change has occurred at that box since the previous point in time. The snapshot 500 includes all the information from the file system 400 needed to exactly recreate the file system 400. Thus, the snapshots of the file system 400 includes the root block 1 (402), intermediary blocks 1 and 2 (410, 412), and data blocks 1-4 (420-426). In this example, there are no previous snapshots. The dead list 502, therefore, is empty because no blocks have been deleted.

Figure 4B:
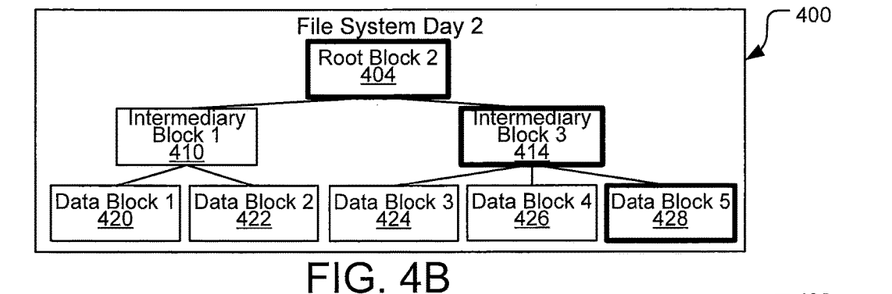
Figure 5B:
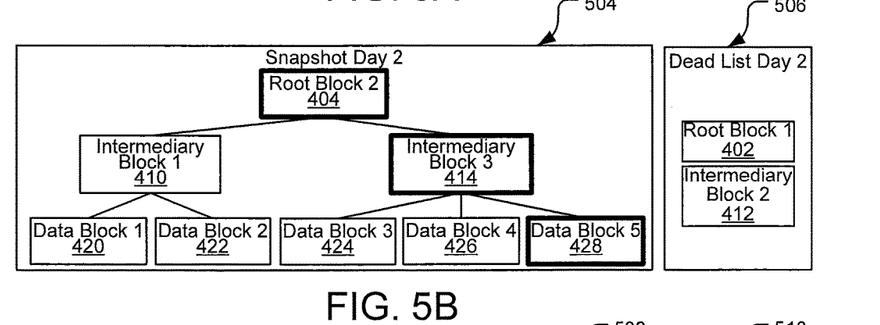

Referring now to FIGS. 4B and 5B representing the file system 400 at day two and the snapshot at day two, a data block 5 (428) has been added to the file system 400. In order to facilitate locating the new data block 5 (428), intermediary block 2 (412) and root block 1 (402) are replaced with root block 2 (404) and intermediary block 3 (414). The snapshot 504 again includes all of the information from the file system 400, but the dead list 506 now includes the blocks that are no longer being used, in this case, the original root block 1 (402) and intermediary block 2 (412) since root block 1 (402) and intermediary block 2 (412) were born before the last snapshot 500 and deleted before the current snapshot 504.

Figure 4C:
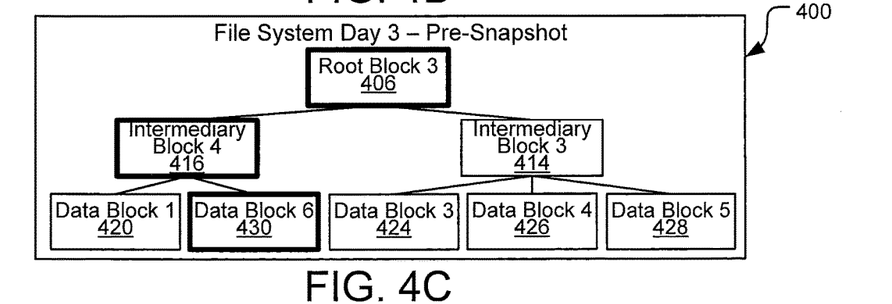
Figure 4D:
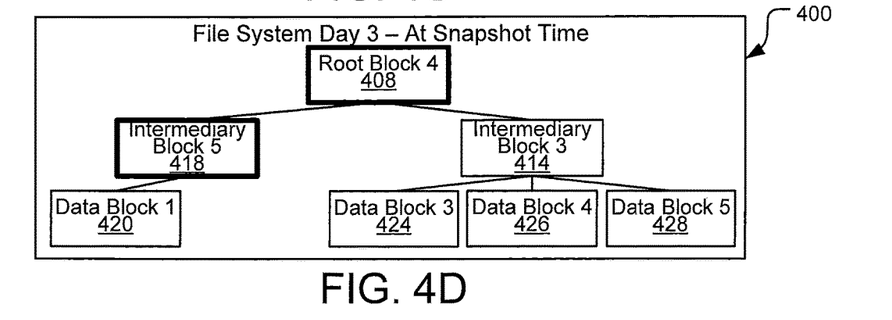
Figure 5C:
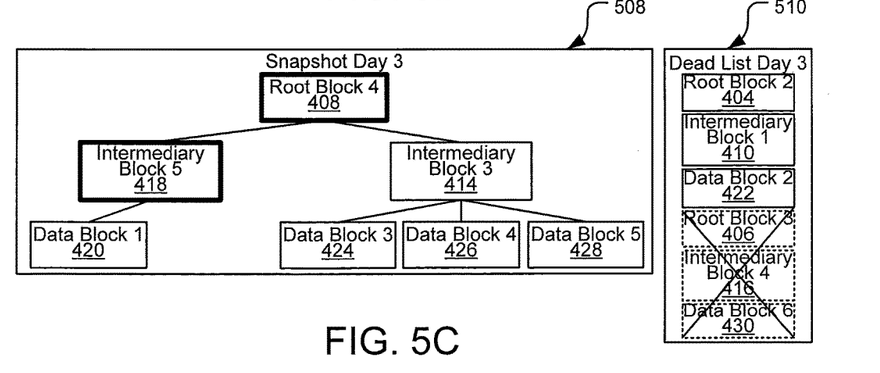

Referring now to FIGS. 4C, 4D, and 5C, the file system 400 is depicted at two different times on a third day. In this example, FIG. 4C depicts the file system 400 at some time after day 2, but before the snapshot 508 is taken on day 3. At the time of the snapshot 508, the file system 400 resembles the file system depicted in FIG. 4D. Referring to FIG. 4C first, in this example, data block 2 (422) is replaced by data block 6 (430) and then deleted before the day 3 snapshot 508 is taken. Because data block 2 (422) is replaced with data block 6 (430), root block 2 (404) is replaced with root block 3 (406) and intermediary block 1 (410) is replaced with intermediary block 4 (416). Referring now to FIG. 4D, data block 6 (430) has been deleted and root block 3 (406) has been replaced with root block 4 (408) and intermediary block 4 (416) has been replaced with intermediary block 5 (418). Thus, when the snapshot 508 is taken, the snapshot includes all of the blocks shown in FIG. 4D and has no record of root block 3 (406), intermediary block 4 (416), or data block 6 (430). The dead list 510 includes root block 2 (404), intermediary block 1 (410), data block 2 (422), but does not include root block 3 (406), intermediary block 4 (416), and data block 6 (430), because these blocks were added after the day two snapshot 504 was taken and deleted before the day 3 snapshot 508 was taken.

Referring back to FIG. 3, and with continued reference to FIGS. 4A-D and 5A-C, the replication progress of the file system 400 may be estimated for a replication taking place on each day. For example, a first network storage appliance having the file system 400 may be configured to replicate the file system 400 to a second network storage appliance. On day 1, a snapshot is taken and a replication is initiated (operation 310). Before any data is sent from the first network storage appliance to the second network storage appliance, the size of the transfer that will take place is estimated (operation 320). The size of the snapshot 500 is one root block 402, two intermediary blocks 410, 412, and four data blocks 420-426. In this example, there is no snapshot before the day 1. Thus, the difference in size between the first snapshot 500 and no snapshot is the size of the first snapshot 500, in this case, one root block 402, two intermediary blocks 410, 412, and four data blocks 420-426 (operation 322).

The dead list 502 contains a listing of each block that was born before the previous snapshot was taken, but deleted before the current snapshot was taken. In this example, there was no previously snapshot taken. Thus, the dead list 500 does not contain any blocks and has a size of zero (operation 324). The difference in size between the snapshots (in bytes) and the size of the dead list are then added to determine the estimated total transfer size (operation 326).

For illustrative purposes, a root block may have a size of 1 kB, an intermediary block may have a size of 1 kB, and each data block may have a size of 10 kB. The estimated size of the transfer would therefore be 43 kB since the snapshot includes one root block (1 kB), two intermediary blocks (2 kB), and four data blocks (40 kB) and in this example the dead list 500 is empty (0 kB). Once the size estimation has been completed, the first network storage appliance may start sending the data (operation 330). As the data is sent, the system updates and displays estimated progress (operation 340). For example, once the transfer size has been estimated, the system may display an estimated transfer size of 43 kB and the total bytes that have been sent. As time progresses, the system may update the total bytes sent until the replication has been completed.

Referring to FIGS. 4B and 5B, the state of the file system 400 on a second day is depicted, along with the corresponding snapshot 504 and dead list 506. On the second day, once replication has been initiated (operation 310) the size of the data transfer may again be estimated (operation 320). In this case, the size of the snapshot 504 is one root block 404, two intermediary blocks 410, 414, and five data blocks 420-428. Thus, the difference in size between the snapshot on day one and the snapshot on day two is one data block 428 (operation 322). The dead list 506 includes one root block 402 and one intermediary block 412 (operation 324). The combined difference between the current and past snapshots and the size of the dead list 506 is therefore one root block 402, one intermediary block 412, and one data block 428 (operation 326). By using the difference in snapshot size and the dead list size, the transfer size may be estimated very quickly when compared to determining every difference between the snapshot from the first day and the snapshot from the second day. The example file system 400 is very small for use as an example, but in many cases, a replication may include a transfer of many gigabytes or even terabytes of data. In those cases, determining each change between snapshots would take an immense amount of time to compute compared to determining file sizes and performing addition and subtraction. Returning to the example, using the example block sizes above, the estimated transfer size would be 12 kB, since the difference in snapshots includes one 10 kB data block 428 and the dead list includes a 1 kB root block 402 and a 1 kB intermediary block 412. Once the size estimation has been completed, the first network storage appliance may start sending the data (operation 330). As the data is sent, the system displays the estimated transfer size of 12 kB and updates the number of bytes sent as time elapses (operation 340).

Referring to FIGS. 4C-D and 5C, the state of the file system 400 on a third day is depicted, along with the corresponding snapshot 508 and dead list 510. In this case, the size of the snapshot 508 is one root block 408, two intermediary blocks 414, 418, and four data blocks 420, 424-428. Thus, the difference in size between the snapshot from the second day and the snapshot from the third day is that the snapshot from the third day has one less data block less than the snapshot from the second day (operation 322). In this case, the third day includes two changes to the file system 400 before the snapshot 508 was taken. Specifically, data block 2 (422) was replaced with data block 6 (430) and then data block 6 (430) was subsequently deleted. These changes resulted in root block 2 (404) to be replaced with root block 3 (406) and intermediary block 1 (410) to be replaced by intermediary block 4 (416) when data block 2 (422) was replaced with data block 6 (430). Root block 3 (406) and intermediary block 4 (416) were replaced with root block 4 (408) and intermediary block 5 (418) respectively when data block 6 (430) was deleted. Since root block 2 (404) was created before the day-two snapshot 504 and deleted before the day-three snapshot 508, root block 2 (404) is included in the dead list 510. Similarly, intermediary block 1 (410) and data block 2 (422) are included in the dead list 510. Root block 3 (406), intermediary block 4 (416), and data block 6 (430) were each born after the day-two snapshot (504) and deleted before the day-three snapshot 508. Thus, root block 3 (406), intermediary block 4 (416), and data block 6 (430) are not included in the current dead list 510 and are depicted on the day three dead list 510 with a dashed line and "X" for reference only. The dead list 510 has a size of one root block 404, one intermediary block 410, and one data block 422 (operation 324). The total estimated size of the transfer is therefore one root block and one intermediary block (operation 326). The size associated with data block 2 (422) in the deadlist (510) is cancelled out by the size difference between the day-three snapshot 508 and the day-two snapshot 504 (the day-three snapshot 508 is smaller than the day-two snapshot 504 by one data block). Once the size estimation has been completed, the first network storage appliance may start sending the data (operation 330). Using the same block sizes above, the estimated transfer size in this case is 2 kB (1 kB root block and 1 kB intermediary block). As the data is sent, the system displays the estimated transfer size of 2 kB and updates the number of bytes sent as time elapses (operation 340).

In most cases, the size of a snapshot may simply be expressed in terms of bytes. For example, using the block size values above, the day-one snapshot 500 may have a size of 43 kB, the day-one dead list 502 may have a size of 0 kB, the day-two snapshot may have a size of 53 kB, the day-two dead list 506 may have a size of 2 kB, the day-three snapshot 508 may have a size of 43 kB, and the day-three dead list 510 may have a size of 12 kB. Thus, the comparison in size between snapshots may involve a direct subtraction of snapshot size. Similarly, the total size of the dead list in bytes may then be added to the snapshot size difference.

Figure 6:
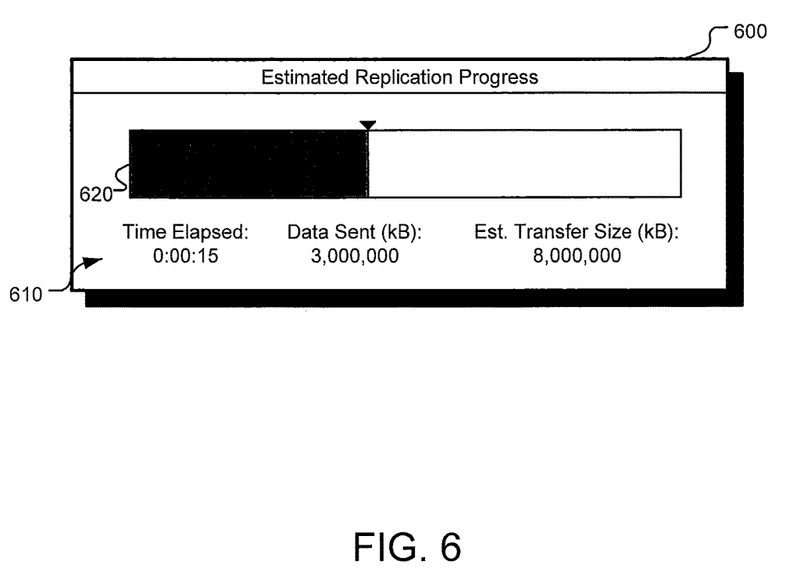
FIG. 6 is a block diagram depicting an example graphical display for replication progress monitoring in accordance with this disclosure.

Referring now to FIG. 6, an example system display 600 depicting the replication progress is illustrated. In this example, the display 600 shows the estimated transfer data 610 that includes the estimated total size of the transfer, the number of bytes transferred, and elapsed time since the transfer began. The display also includes a progress bar 620 showing graphically representing the total Bytes sent and the estimated size. In various other embodiments, the display 600 may include any other available information related to the transfer. For example, the transfer data 610 may also include real-time transfer speeds, estimated time to completion, source and destination information, or any other information that is relevant to a user.

In various embodiments, the replication monitoring system may be configured to address various system configurations and potential problems that a system may encounter. For example, an administrator may configure a first network storage appliance to capture snapshots on a daily basis, but only perform replications on a weekly basis. In this case, the replication would include each snapshot taken since the previous snapshot.

Figure 7:
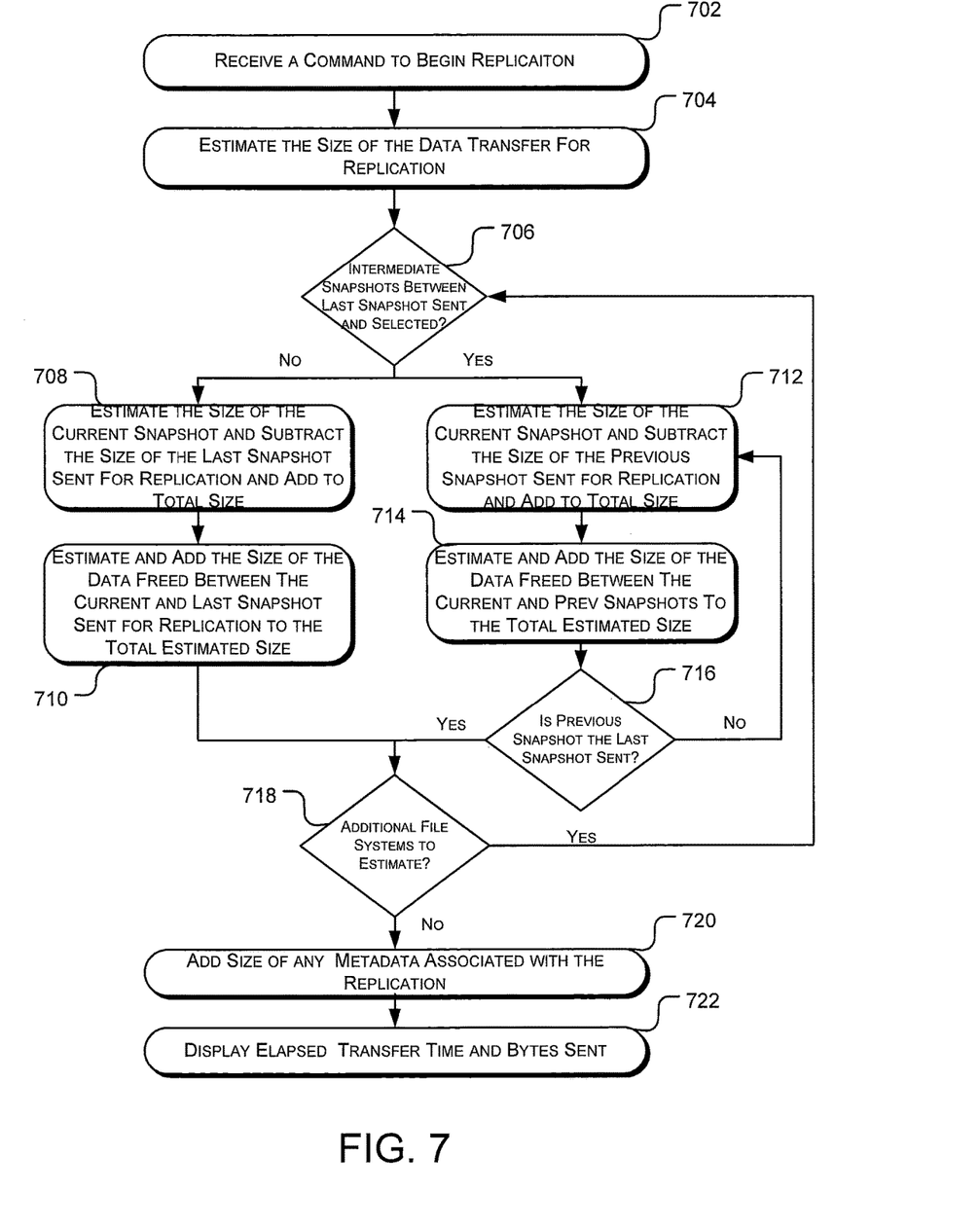
FIG. 7 is a flow diagram illustrating an example method of replication progress monitoring in accordance with this disclosure.

Referring now to FIG. 7, the operation of an alternative embodiment of a replication progress monitoring system is shown. In this embodiment, the replication progress monitoring system is capable of estimating the transfer size for configurations that may or may not include intermediate snapshots. Intermediate snapshots are snapshots of a file system that are taken between replications. Information from both the latest snapshot and any intermediate snapshot may be sent to the receiving system in order to perform a replication of a file system that uses intermediate snapshots.

For example, a first network storage appliance may receive a command or series of commands to begin the replication of one or more file systems (operation 702). Before beginning the replication, the replication progress monitoring system estimates the size of the transfer (operation 704). The replication progress monitoring system may then assess whether the file systems being replicated include intermediate snapshots (operation 706). If there are no intermediate snapshots, the system operates similarly to what was described above with reference to FIGS. 3, 4A-D and 5A-C. The size of the selected snapshot is compared to the size of the last snapshot sent (operation 708) and the size of the dead list of the selected snapshot is added to the difference (operation 710).

If, on the other hand, the replication involves intermediate snapshots, then the replication progress monitoring system may sequentially analyze the preceding intermediate snapshots to estimate the total transfer size. More particularly, starting with the current snapshot, the size of the current snapshot may be compared to the size of the immediately previous intermediate snapshot (operation 712). The size of the data freed between the latest snapshot and the intermediate snapshot may then be added (operation 714). The system then checks to see if the previous snapshot was the last snapshot sent (operation 716). If the previous snapshot was the last snapshot sent for replication, then the totals may be aggregated and the system may move forward. If the previous snapshot was an intermediate snapshot then the process is repeated, setting the previous snapshot to the current snapshot and then comparing it to the snapshot taken before immediately prior to it. The process is repeated for each snapshot until the last snapshot sent for replication has been compared to the intermediate snapshot taken before it.

The process for determining the size of a transfer involving intermediate snapshots may be illustrated using FIGS. 4A-D and 5A-C. For example, the network storage appliance operating the file system 400 may be configured to take snapshots on a daily basis and to perform replication every other day. Thus, on the first day, illustrated in FIGS. 4A and 5A, the snapshot 500 is sent to the second network storage appliance. On the second day, illustrated in FIGS. 4B and 5B, the snapshot 504 is taken, but is stored on the first network storage appliance. On the third day, illustrated in FIGS. 4D and 5C, the snapshot from the previous day 504 and the current day 508 are sent to the second network storage appliance. In this example, the estimation of the transfer size on the first day would operate in the same manner described above with reference to FIG. 3, but, in this case, the intermediate snapshot from day two is used by the replication monitoring system to estimate the transfer size on day 3.

The size of the day-one snapshot 500 is one root block 402, two intermediary blocks 410, 412, and four data blocks 420-426 and the day-one dead list 502 is empty. The size of the day-two snapshot 504 is one root block 404, two intermediary blocks 410, 414, and five data blocks 420-428 and day-two dead list 506 includes one root block 402 and one intermediary block 412. The size of the day-three snapshot 508 is one root block 408, two intermediary blocks 414, 418, and four data blocks 420, 424-428 and the size of the day-three dead list 510 is one root block 404, one intermediary block 410 and one data block 422.

To estimate the size of the data transfer that will occur during the replication, the process starts by comparing the most current snapshot to the previous snapshot. In this case, the day-three snapshot 508 is the most current snapshot and the day-two snapshot 504 is the immediately previous snapshot. The difference in size between the day-three snapshot 508 and the day-two snapshot 504 is one data block (operation 712) and the day-three dead list 510 includes one root block 404, one intermediary block 410 and one data block 422 (operation 714). The estimated transfer size therefore includes one root block and one intermediary block. Since the day-two snapshot 504 is an intermediate snapshot and was not the last snapshot sent for replication, the operation is repeated with the intermediate snapshot 504 and its preceding snapshot, here the day-one snapshot 500 (operation 716). The difference in size between the day-two snapshot 504 and the day-one snapshot 500 is the size of one data block 428. The size of a single data block is then added to the estimated total (operation 712). The day-two dead list 506 includes one root block 402 and one intermediary block 412. The size of these blocks may also be added to the total estimate (operation 714). Since the day-one snapshot 500 was previously sent to the second network storage appliance for replication, the estimation of the size of the data transfer related to that file system is completed (operation 716). The total estimated size includes the size of two root blocks (1 kB each), two intermediary blocks (1 kB each), and one data block (10 kB each). Using the same block sizes as described above, the estimated total transfer size is 14 kB.

After the replication progress monitoring system has estimated the size of a file system that is being replicated, it may move any additional file systems that are slated for replication from the first network storage appliance to the second network storage appliance (operation 718) and the process of estimating the transfer size for the replication may be repeated for each file system and the estimated sizes may be aggregated into an estimated total transfer size. The replication monitoring system may also include any metadata associated with the replication in the total estimated size (operation 720). The system may then allow the data transfer for the replication to begin and start displaying the estimated replication progress including the elapsed time, total number of bytes sent, estimated total transfer size, transfer rate, and estimated time to complete.

Figure 8A:
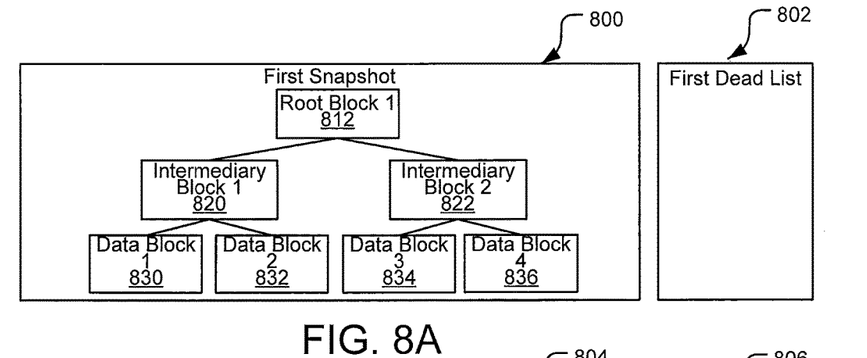
FIGS. 8A-C are block diagrams illustrating example three consecutive snapshots and dead lists of a file system.
Figure 8B:
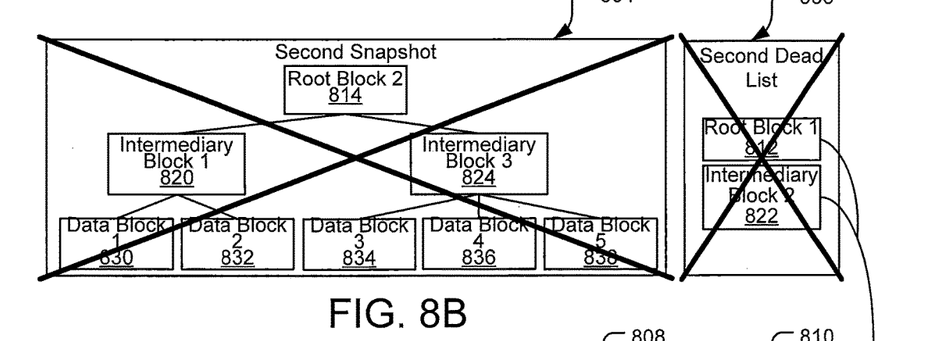
Figure 8C:
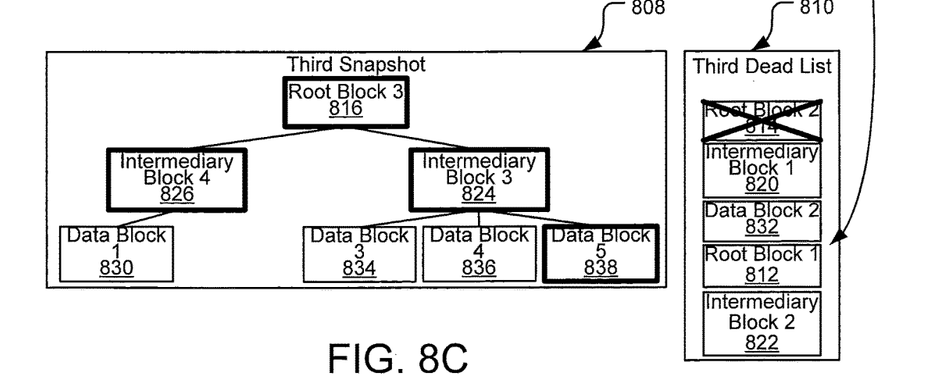

In some cases, an intermediate snapshot may be deleted. Referring to FIGS. 8A-C, a first snapshot 800 and dead list 802, a second snapshot 804 and dead list 804, and a third snapshot 808 and third dead list 810 are depicted. In this example, the first snapshot 800 and dead list 802 were used in a replication, and replication is scheduled to occur again after taking the second snapshot 804 and the third snapshot 808. For various reasons, a system administrator may have deleted the second snapshot 804 before replication could take place.

In network storage appliances, a snapshot may be deleted using a snapshot specific delete command. When the snapshot delete command is executed, the network storage appliance determines which blocks of data are freed from memory and also maintains the dead list associated with the snapshot. This may be accomplished by iterating over the dead list of a later in time snapshot and comparing the birth time of each block in the dead list (here, the third dead list 810) to the birth time of a previous snapshot (first snapshot 800). Any blocks in the third dead list 810 that were born after the first snapshot may be removed. In this case, root block 2 (814) is removed from the third dead list 810 since it was born after the first snapshot 802. Furthermore, the blocks found in the second dead list 806 are also moved to the third dead list 810. The result is that any block that was born before the first snapshot 800 (and therefore present in the first snapshot 800) and deleted before the third snapshot 808 was taken, is included in the third dead list 810.

In the case of an intermediate snapshot being deleted, the replication progress monitoring system is configured to operate in relatively the same manner when a snapshot has not been deleted. For example, with continued reference with to FIGS. 8A-C and with reference to FIG. 7, a network storage appliance may receive one or more commands to begin the replication of the a file system illustrated by the snapshot 808 (operation 702). In this example, the last snapshot used for replication was the first snapshot 800. The second snapshot 804 was taken at some time between the first snapshot 800 and the third snapshot 808, but was deleted before the replication was initiated. Thus, when the replication monitoring system begins the estimation of the size of the transfer (operation 704), there are no intermediate snapshots between the third snapshot 808 and the first snapshot 800 (operation 706). Thus, the size estimation includes comparing the size of the third snapshot 808 and the first snapshot 800 (operation 708). In this case, the third snapshot 808 and the first snapshot 800 both include one root block, two intermediary blocks, and four data blocks. Thus, there is no difference in size between the third snapshot 808 and the first snapshot 800. The day three dead list includes one root block, two intermediary blocks, and one data block and thus the size of the blocks may be added to the total transfer size (operation 718). In this case, there is only a single file system being replicated and for simplicity, only a negligible amount of metadata in comparison to the total size of the transfer (operations 718, 720). The transfer may be initiated from the first to the second network storage appliance, and the estimated progress of the replication may be displayed to the user (operation 722).

Figure 9:
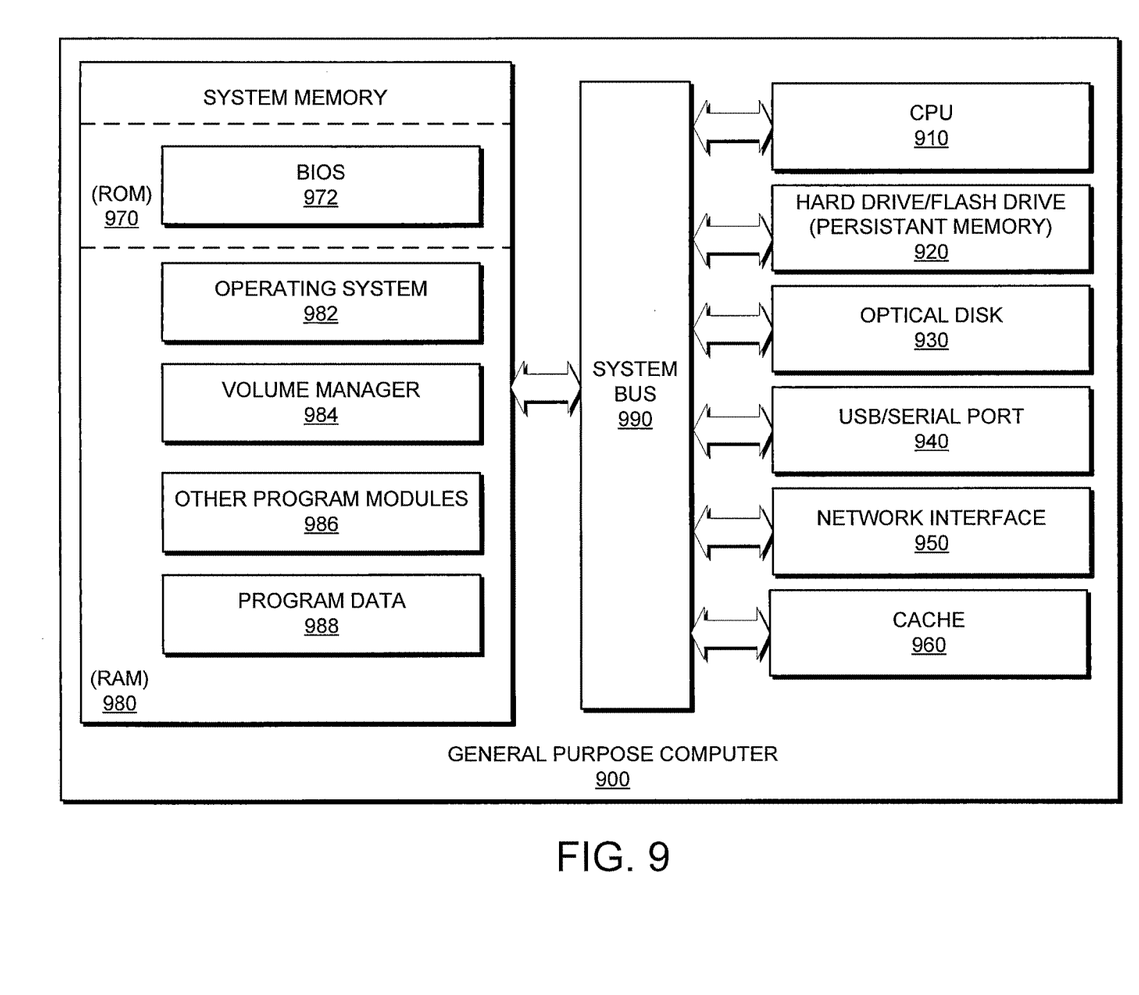
FIG. 9 is a block diagram illustrating an example of a general purpose computing system that may be used in the application of the present disclosure.

FIG. 9 illustrates an example general purpose computer 900 that may be useful in implementing the described technology. The example hardware and operating environment of FIG. 9 for implementing the described technology includes a network storage appliance, such as general purpose computing device in the form of a personal computer, server, or other type of computing device. In the implementation of FIG. 9, for example, the network storage appliance 800 includes a processor 910, a cache 960, a system memory 970, 980, and a system bus 990 that operatively couples various system components including the cache 960 and the system memory 970, 980 to the processor 910. There may be only one or there may be more than one processor 910, such that the processor of the network storage appliance 900 comprises a single central processing unit (CPU), or a plurality of processing units, commonly referred to as a parallel processing environment. The network storage appliance 900 may be a conventional computer, a distributed computer, or any other type of computer; the invention is not so limited.

The system bus 990 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 970 and random access memory (RAM) 980. A basic input/output system (BIOS) 972, containing the basic routines that help to transfer information between elements within the network storage appliance 900 such as during start-up, is stored in ROM 970. The network storage appliance further includes one or more hard disk drives or Flash-based drives 920 for reading from and writing to a persistent memory such as a hard disk, a flash-based drive, and an optical disk drive 930 for reading from or writing to a removable optical disk such as a CD ROM, DVD, or other optical media.

The hard disk drive 920 and optical disk drive 930 are connected to the system bus 990. The drives and their associated computer-readable media provide nonvolatile storage of computer-readable instructions, data structures, program engines and other data for the network storage appliance 900. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, ROM 970, or RAM 980, including an operating system 982, a volume manager 984, one or more application programs 986, and program data 988. A user may enter commands and information into the network storage appliance 900 through input devices such as a keyboard and pointing device connected to the USB or Serial Port 940. These and other input devices are often connected to the processor 910 through the USB or serial port interface 940 that is coupled to the system bus 990, but may be connected by other interfaces, such as a parallel port. A monitor or other type of display device may also be connected to the system bus 990 via an interface, such as a video adapter 960. In addition to the monitor, computers typically include other peripheral output devices (not shown), such as speakers and printers.

The network storage appliance 900 may operate in a networked environment using logical connections to one or more remote computers. These logical connections are achieved by a network interface 950 coupled to or a part of the network storage appliance 900; the invention is not limited to a particular type of communications device. The remote computer may be another computer, a server, a router, a network PC, a client, a peer device, a network storage appliance such as a ZFS storage appliance, or other common network node, and typically includes many or all of the elements described above relative to the network storage appliance 900. The logical connections include a local-area network (LAN) a wide-area network (WAN), or any other network. Such networking environments are commonplace in office networks, enterprise-wide computer networks, intranets and the Internet, which are all types of networks.

The network adapter 950, which may be internal or external, is connected to the system bus 990. In a networked environment, programs depicted relative to the network storage appliance 900, or portions thereof, may be stored in the remote memory storage device. It is appreciated that the network connections shown are example and other means of and communications devices for establishing a communications link between the computers may be used.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method of replication progress monitoring, comprising:
   generating, using a processor and at a first time, first snapshot data that includes a first copy of a dataset residing on a first storage appliance, the first copy of the dataset having an associated first dataset structure;
   generating, using the processor and at a second time, second snapshot data that includes a second copy of the dataset, the second copy of the dataset having an associated second dataset structure;
   determining, using the processor, a first snapshot size difference based on a difference between a first size of the first copy of the dataset and a second size of the second copy of the dataset;
   generating, using the processor, a first dead list, the first dead list including one or more data blocks included in the first copy of the dataset and absent from the second copy of the dataset;
   defining, using the processor, a first released data size, the first released data size being equal to a total size of the first dead list;
   generating, using the processor and at a third time, third snapshot data that includes a third copy of the dataset, the third copy of the dataset having an associated third dataset structure;
   determining, using the processor, a second snapshot size difference based on a difference between the second size of the second copy of the dataset and a third size of the third copy of the dataset;
   generating, using the processor, a second dead list, the second dead list including one or more data blocks included in the second copy of the dataset and absent from the third copy of the dataset;
   defining, using the processor, a second released data size, the second released data size being equal to a total size of the second dead list;
   estimating, by the processor, a replication transfer size by combining:
   the first snapshot size difference;
   the second snapshot size difference;
   the first released data size; and
   the second released data size;
   generating, using the processor and using the replication transfer size, an estimated replication progress of transferring the dataset from the first storage appliance to a second storage appliance; and
   outputting, using the processor, the estimated replication progress for display on a monitor as a displayed replication progress, the displayed replication progress used to determine a status of the replication.

2. The method of claim 1, further comprising:
   adding, using the processor, a metadata size to the replication transfer size, wherein the metadata size comprises one or more bytes of data related to an overhead data for transferring data.

3. The method of claim 2, wherein outputting the estimated replication progress includes displaying a total number of bytes transferred and the replication transfer size on the monitor.

4. The method of claim 3, wherein outputting the estimated replication progress further includes displaying at least one of a data transfer rate and an estimated time to complete on the monitor.

5. The method of claim 2, wherein the first storage appliance and the second storage appliance operate using a storage appliance file system.

6. A system for estimating replication progress comprising:
   a storage appliance including a processor coupled to a system memory and a persistent memory, the persistent memory storing a file system and the system memory storing instructions for execution on the processor, the instructions configured to cause the processor to:
   generate, at a first time, first snapshot data that includes a first copy of the file system the first copy being associated with a first structure;

generate, at a second time, second snapshot data that includes a second copy of the file system, the second copy being associated with a second structure;

determine a first snapshot size difference based on a difference between a first size of the first copy and a second size of the second copy;

generate a first dead list, the first dead list including one or more data blocks included in the first copy of the file system and absent from the second copy of the file system;

define a first released data size, the first released data size being equal to total size of the first dead list;

generate, at a third time, third snapshot data that includes a third copy of the file system the third copy being associated with a third structure;

determine a second snapshot size difference based on a difference between the second size of the second copy of the file system and a third size of the third copy of the file system;

generate a second dead list, the second dead list including one or more data blocks included in the second copy of the file system and absent from the third copy of the file system;

define a second released data size, the second released data size being equal to a total size of the second dead list;

estimate a replication transfer size by combining:
   the first snapshot size difference;
   the second snapshot size difference;
   the first released data size; and
   the second released data size;

output, using the replication transfer size, a replication progress for display on a monitor, the replication progress used to determine a status of the replication.

7. The system of claim 6, wherein the instructions are further configured to cause the processor to:
   begin a data transfer for a replication; and
   display a total number of bytes transferred and the replication transfer size with the replication progress.

8. The system of claim 7, wherein the storage appliance further comprises a network interface configured to connect to a second system over a network for the replication.

9. The system of claim 8, wherein the instructions are further configured to cause the processor to add a metadata size to the replication transfer size, wherein the metadata size comprises one or more bytes of data related to an overhead data for the data transfer to the second system.

10. The method of claim 3, further comprising:
   connecting to a second system using a network; and
   beginning a data transfer, over the connection, for replication on the second system, wherein the total number of bytes transferred corresponds to data transferred to the second system.

11. A computer-program product tangibly embodied in a non-transitory machine-readable storage medium, including instructions configured to cause one or more data processors to perform actions including:
   generating, at a first time, first snapshot data that includes a first copy of a dataset residing on a first storage appliance, the first copy of the dataset having an associated first dataset structure;
   generating, at a second time, second snapshot data that includes a second copy of the dataset, the second copy of the dataset having an associated second dataset structure;
   determining a first snapshot size difference based on a difference between a first size of the first copy of the dataset and a second size of the second copy of the dataset;
   generating a first dead list, the first dead list including one or more data blocks included in the first copy of the dataset and absent from the second copy of the dataset;
   defining a first released data size to a total size of the first dead list;
   generating, at a third time, third snapshot data that includes a third copy of the dataset, the third copy of the dataset having an associated third dataset structure;
   determining a second snapshot size difference based on a difference between the second size of the second copy of the dataset and a third size of the third copy of the dataset;
   generating a second dead list, the second dead list including one or more data blocks included in the second copy of the dataset and absent from the third copy of the dataset;
   defining a second released data size, the second released data size being equal to a total size of the second dead list;
   estimating a replication transfer size by combining:
      the first snapshot size difference;
      the second snapshot size difference;
      the first released data size; and
      the second released data size;
   generating an estimated replication progress of transferring the dataset from the first storage appliance to a second storage appliance using the replication transfer size; and
   outputting the estimated replication progress for display on a monitor as a displayed replication progress, the displayed replication progress used to determine a status of the replication.

12. The computer-program product of claim 11, wherein the actions further include adding a metadata size to the replication transfer size, wherein the metadata size comprises one or more bytes of data related to an overhead data for transferring data.

13. The computer-program product of claim 11, wherein outputting the estimated replication progress includes displaying a total number of bytes transferred and the replication transfer size on the monitor.

14. The computer-program product of claim 13, wherein the actions further include:
   connecting to a second system using a network; and
   beginning a data transfer, over the connection, for replication on the second system, wherein the total number of bytes transferred corresponds to data transferred to the second system.

15. The computer-program product of claim 11, wherein outputting the estimated replication progress further includes displaying at least one of a data transfer rate and an estimated time to complete on the monitor.

16. The computer-program product of claim 11, wherein the first storage appliance and the second storage appliance operate using a storage appliance file system.

17. The system of claim 6, wherein the replication progress is output to be displayed concurrently with at least one of a data transfer rate and an estimated time to complete on the monitor.

* * * * *

UNITED STATES PATENT AND TRADEMARK OFFICE
CERTIFICATE OF CORRECTION

PATENT NO. : 10,311,028 B2
APPLICATION NO. : 13/896033
DATED : June 4, 2019
INVENTOR(S) : Morris et al.

Page 1 of 1

It is certified that error appears in the above-identified patent and that said Letters Patent is hereby corrected as shown below:

In the Specification

In Column 11, Line 47, delete "the a" and insert -- a --, therefor.

In the Claims

In Column 14, Line 47, in Claim 3, delete "claim 2," and insert -- claim 1, --, therefor.

In Column 14, Line 55, in Claim 5, delete "claim 2," and insert -- claim 1, --, therefor.

In Column 15, Line 12, in Claim 6, delete "to total," and insert -- to a total --, therefor.

Signed and Sealed this
Twenty-first Day of July, 2020

Andrei Iancu
*Director of the United States Patent and Trademark Office*